United States Patent
Fan et al.

(10) Patent No.: US 12,474,797 B2
(45) Date of Patent: Nov. 18, 2025

(54) TOUCH SUBSTRATE, DISPLAY TOUCH PANEL, AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Cong Fan, Beijing (CN); Xiangdan Dong, Beijing (CN); Fan He, Beijing (CN); Kemeng Tong, Beijing (CN)

(73) Assignees: CHENGDU BOE OPTOELECTRONICS TECHNOLOGY CO., LTD., Chengdu (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/578,762

(22) PCT Filed: Aug. 23, 2021

(86) PCT No.: PCT/CN2021/114020
§ 371 (c)(1),
(2) Date: Jan. 12, 2024

(87) PCT Pub. No.: WO2023/023888
PCT Pub. Date: Mar. 2, 2023

(65) Prior Publication Data
US 2024/0385715 A1    Nov. 21, 2024

(51) Int. Cl.
G06F 3/041       (2006.01)
G06F 3/044       (2006.01)

(52) U.S. Cl.
CPC ........ *G06F 3/04164* (2019.05); *G06F 3/0412* (2013.01); *G06F 3/0446* (2019.05); *G06F 3/0448* (2019.05)

(58) Field of Classification Search
CPC .. G06F 3/04164; G06F 3/0412; G06F 3/0446; G06F 3/0448; G06F 3/0443; G06F 3/041
See application file for complete search history.

(56) References Cited

U.S. PATENT DOCUMENTS

| 11,275,459 B2 * | 3/2022 | Rhe ........................ G06F 3/047 |
| 2013/0002583 A1 * | 1/2013 | Jin ......................... G06F 3/041 |
| | | 313/511 |

(Continued)

FOREIGN PATENT DOCUMENTS

| CN | 102855822 A | 1/2013 |
| CN | 103810945 A | 5/2014 |

(Continued)

OTHER PUBLICATIONS

International Search Report received for PCT Patent Application No. PCT/CN2021/114020, mailed on May 17, 2022, 4 pages (2 pages of English Translation and 2 pages of Original copy attached).

*Primary Examiner* — Amy Onyekaba
(74) *Attorney, Agent, or Firm* — ArentFox Schiff LLP; Michael Fainberg (57) ABSTRACT

A touch substrate includes multiple touch electrodes and multiple touch leads, and has a touch region and a non-touch region. The touch electrodes are located in the touch region, and the touch leads are located in the non-touch region and provide signals for the touch electrodes. The touch substrate is divided into a flat region and a bending region(s) by a bending boundary. The touch substrate includes: a first side, a second side and a corner between the first side and the second side. The bending boundary substantially extends in the extension direction of the first edge and intersects with the second edge. A touch lead includes: a corner lead, an end of the corner lead is connected with a first lead portion, and (Continued)

the corner lead is completely located in the bending region and does not overlap with the bending boundary.

20 Claims, 5 Drawing Sheets

(56) References Cited

U.S. PATENT DOCUMENTS

| | | | |
|---|---|---|---|
| 2014/0132488 A1 | 5/2014 | Kim et al. | |
| 2016/0188098 A1* | 6/2016 | Her | G06F 1/1652 |
| | | | 345/173 |
| 2016/0195963 A1* | 7/2016 | Esaka | G02F 1/13338 |
| | | | 345/174 |
| 2016/0306462 A1* | 10/2016 | Park | G06F 3/0446 |
| 2017/0170253 A1* | 6/2017 | Kim | H10K 77/111 |
| 2017/0308202 A1* | 10/2017 | Fang | G02F 1/0316 |
| 2017/0358641 A1* | 12/2017 | Park | H10K 59/1213 |
| 2018/0031880 A1 | 2/2018 | Kwak et al. | |
| 2018/0068156 A1 | 3/2018 | Jang et al. | |
| 2018/0247582 A1 | 8/2018 | Park et al. | |
| 2018/0322826 A1 | 11/2018 | Lee et al. | |
| 2018/0348930 A1 | 12/2018 | Lee et al. | |
| 2018/0356668 A1* | 12/2018 | Koide | G02F 1/13338 |
| 2019/0042038 A1 | 2/2019 | Lee | |
| 2019/0108787 A1 | 4/2019 | Hirakata et al. | |
| 2019/0204957 A1* | 7/2019 | Nakagome | G06F 3/0412 |
| 2019/0252412 A1 | 8/2019 | An et al. | |
| 2019/0361286 A1 | 11/2019 | Jang | |
| 2020/0058710 A1* | 2/2020 | Li | H10K 59/131 |
| 2020/0301544 A1 | 9/2020 | Jeong et al. | |
| 2020/0379595 A1 | 12/2020 | Kim | |
| 2021/0005677 A1* | 1/2021 | Lee | G06F 3/04166 |
| 2021/0013447 A1 | 1/2021 | Lee et al. | |
| 2021/0072865 A1* | 3/2021 | He | G06F 3/0443 |
| 2022/0066609 A1 | 3/2022 | Han et al. | |
| 2022/0100303 A1* | 3/2022 | Lee | G06F 3/0416 |
| 2022/0392962 A1* | 12/2022 | Park | G06F 3/0448 |
| 2023/0152920 A1 | 5/2023 | He et al. | |

FOREIGN PATENT DOCUMENTS

| | | |
|---|---|---|
| CN | 107797700 A | 3/2018 |
| CN | 108508968 A | 9/2018 |
| CN | 108878475 A | 11/2018 |
| CN | 108984008 A | 12/2018 |
| CN | 109388277 A | 2/2019 |
| CN | 110531884 A | 12/2019 |
| CN | 110676295 A | 1/2020 |
| CN | 111261679 A | 6/2020 |
| CN | 111554190 A | 8/2020 |
| CN | 111630445 A | 9/2020 |
| CN | 111722744 A | 9/2020 |
| CN | 112018155 A | 12/2020 |
| CN | 112035013 A | 12/2020 |

\* cited by examiner

TOUCH SUBSTRATE, DISPLAY TOUCH PANEL, AND DISPLAY DEVICE

CROSS REFERENCE TO RELATED APPLICATIONS

This application is a national phase entry under 35 U.S.C. § 371 of International Application No. PCT/CN2021/114020, filed on Aug. 23, 2021, the entire content of which is incorporated herein by reference.

TECHNICAL FIELD

The disclosure relates to the field of display technology, in particular to a touch substrate, a display touch panel and a display apparatus.

BACKGROUND

With the rapid development and application of a flexible organic light emitting diode display technology, how to improve consumers' aesthetic experience of highly integrated On Cell flexible touch products, reduce production costs of current flexible products, and improve yield of the flexible products has become one of key issues that need to be solved for the current flexible products.

SUMMARY

A touch substrate provided by an embodiment of the disclosure includes a plurality of touch electrodes and a plurality of touch leads. The touch substrate includes a touch region and a non-touch region, the plurality of touch electrodes are located in the touch region, and the plurality of touch leads are located in the non-touch region and configured to provide signals for the plurality of touch electrodes. The touch substrate includes at least one bending boundary, and the touch substrate is divided into a flat region and a bending region located on at least one side of the flat region. The touch substrate includes a first edge, a second edge adjacent to the first edge, and a corner between the first edge and the second edge. The at least one bending boundary is at least partially located in the touch region and extends to the non-touch region, and the at least one bending boundary substantially extends in an extension direction of the first edge and intersects with the second edge. At least one touch lead among the plurality of touch leads includes: a corner lead located in at least one corner in the touch substrate, and a first lead portion connected with an end of the corner lead. The first lead portion substantially extends in an extension direction of the second edge, and the corner lead is completely located in the bending region and does not overlap the bending boundary.

In some embodiments, the first lead portion is at least partially located in the bending region and overlaps the bending boundary.

In some embodiments, the other end of the corner lead is connected with a second lead portion. The second lead portion substantially extends in the extension direction of the first edge, is completely located in the bending region, and does not overlap the bending boundary.

In some embodiments, an end of the second lead portion not connected with the corner lead is electrically connected with one of the plurality of touch electrodes.

In some embodiments, the touch substrate further includes: a plurality of wiring terminals located in the non-touch region; and the first lead portion is electrically connected with one of the plurality of wiring terminals.

In some embodiments, the touch substrate further includes: a plurality of wiring terminals located in the non-touch region. At least one of the plurality of touch leads includes: two corner leads and two first lead portions; the second lead portion is connected with the two corner leads; and one of the two first lead portions is electrically connected with one of the plurality of wiring terminals, and the other one of the two first lead portions is electrically connected with one of the plurality of touch electrodes.

In some embodiments, the other end of the corner lead is electrically connected with one of the plurality of touch electrodes.

In some embodiments, the touch substrate further includes a third edge disposed opposite to the first edge. The touch substrate includes: two bending boundaries, close to the first edge and the third edge respectively, and the touch substrate is divided into a flat region and bending regions located on two opposite sides of the flat region.

In some embodiments, the corner lead in at least one touch lead among the plurality of touch leads is located at a corner between the third edge and second edge.

In some embodiments, the corner lead is an arc lead, the first lead portion is a straight lead, and the second lead portion is a straight lead.

In some embodiments, a boundary of the touch region and the non-touch region has an arc part, and a radius of the arc part is smaller than a radius of the corner lead.

In some embodiments, the first lead portion includes a first lead layer and a second lead layer which are disposed in a stacked manner.

In some embodiments, in a region where the bending boundary overlaps the first lead portion, the second lead layer is electrically connected with the first lead layer.

In some embodiments, the touch substrate further includes a first insulating layer between the first lead layer and the second lead layer. The first insulating layer has a first via hole going through the first insulating layer along a thickness direction of the first insulating layer; and the bending boundary overlaps the first via hole, and the second lead layer is electrically connected with the first lead layer through the first via hole.

In some embodiments, the touch substrate further includes a first insulating layer between the first lead layer and the second lead layer. The first insulating layer has a first via hole going through the first insulating layer along a thickness direction of the first insulating layer; and the bending boundary does not overlap the first via hole, the first via hole is at least partially located in the region where the bending boundary overlaps the first lead portion, and the second lead layer is electrically connected with the first lead layer through the first via hole.

In some embodiments, the first lead layer or second lead layer includes a first sub-lead portion and a second sub-lead portion which are disconnected at the bending boundary.

In some embodiments, a distance between an edge of the first sub-lead portion close to the bending boundary and the bending boundary is equal to a distance between an edge of the second sub-lead portion close to the bending boundary and the bending boundary.

In some embodiments, the second lead layer is located on a side of the first lead layer facing a touch surface of the touch substrate, and the first lead layer includes the first sub-lead portion and the second sub-lead portion.

In some embodiments, a bending angle of the bending region is greater than or equal to 80 degrees.

A display touch panel provided by an embodiment of the disclosure includes: a drive backplane including a display region and a peripheral region surrounding the display region; a plurality of light emitting devices on a side of the drive backplane in the display region; a packaging layer on a side of the light emitting devices facing away from the drive backplane; and the touch substrate provided by the embodiment of the disclosure, which is directly formed on the packaging layer.

In some embodiments, the display region coincides with a touch region, and the display region includes a plurality of pixels arranged in an array. The quantity N of pixel columns between an edge of the display region located in a flat region and a bending boundary closest to the display region, a bending radius r1 of a corner lead closest to the display region, a pixel spacing $P_{pixel}$, and a total thickness Total of the touch substrate meet the following condition:

$$N = \frac{\pi \times (r1 - \text{Total}) \times 1000}{P_{pixel}}.$$

In some embodiments, the radius of the corner lead closest to the display region is greater than or equal to 1.5 millimeters and smaller than or equal to 2.4 millimeters.

A display apparatus provided by an embodiment of the disclosure includes the display touch panel provided by the embodiment of the disclosure.

In some embodiments, the display apparatus further includes a cover plate attached to the touch panel on a side of a touch substrate facing away from a drive backplane. The cover plate has the same bending region and flat region as the touch substrate.

In some embodiments, when a first lead portion includes a first lead layer and a second lead layer which are disposed in a stacked manner, and the first lead layer or the second lead layer includes a first sub-lead portion and a second sub-lead portion which are disconnected at a bending boundary, the quantity n of pixel columns between the first sub-lead portion and the bending boundary, as well as the second sub-lead portion and the bending boundary meets the following condition:

$$n = (A + W)/P_{pixel};$$

here, A is attaching accuracy between the cover plate and the display touch panel, and W is a maximum transmission range of bending stress borne by the display touch panel.

BRIEF DESCRIPTION OF FIGURES

In order to explain technical solutions in embodiments of the disclosure more clearly, the following will briefly introduce accompanying drawings needed to be used in the description of the embodiments. Obviously, the accompanying drawings in the following description are only some embodiments of the disclosure. For those of ordinary skill in the art, other accompanying drawings may further be obtained according to these accompanying drawings without involving creative labor.

DETAILED DESCRIPTION

To make objectives, technical solutions and advantages of embodiments of the disclosure clearer, the technical solutions of the embodiments of the disclosure will be clearly and completely described below in conjunction with accompanying drawings of the embodiments of the disclosure. Apparently, the described embodiments are only a part of the embodiments of the disclosure, not all of the embodiments. The embodiments in the disclosure and features in the embodiments can be combined with each other in the case of not conflicting. Based on the described embodiments of the disclosure, all other embodiments obtained by those ordinarily skilled in the art without creative work shall fall within the protection scope of the disclosure.

Unless otherwise indicated, technical or scientific terms used in the disclosure shall have the ordinary meanings understood by those ordinarily skilled in the art to which the disclosure pertains. The words "first", "second" and the similar words used in the disclosure do not indicate any order, quantity or importance, but are only used to distinguish different components. The words "comprise" or "include" and the like indicate that an element or item appearing before such the word covers listed elements or items appearing after the word and equivalents thereof, and does not exclude other elements or items. The words "connect" or "couple" and the like are not limited to physical or mechanical connection, but may include electrical connection, whether direct or indirect.

It needs to be noted that sizes and shapes of all figures in the accompanying drawings do not reflect true scales, and are only intended to schematically illustrate the content of the disclosure. The same or similar reference numerals represent the same or similar elements or elements with the same or similar functions all the time.

A waterfall screen with a large-angle cover plate (CG) attached has undoubtedly attracted the attention of consumers with its extremely stunning shape design. However, for the above high-specification flexible On_cell large-angle CG bending shape products, it undoubtedly poses great challenges to various process technologies. The problem of cracking in touch signal wires at four corners of a flexible touch display screen caused by attachment of the large-angle CG is relatively serious, which reduces yield of product design.

Figure 1:
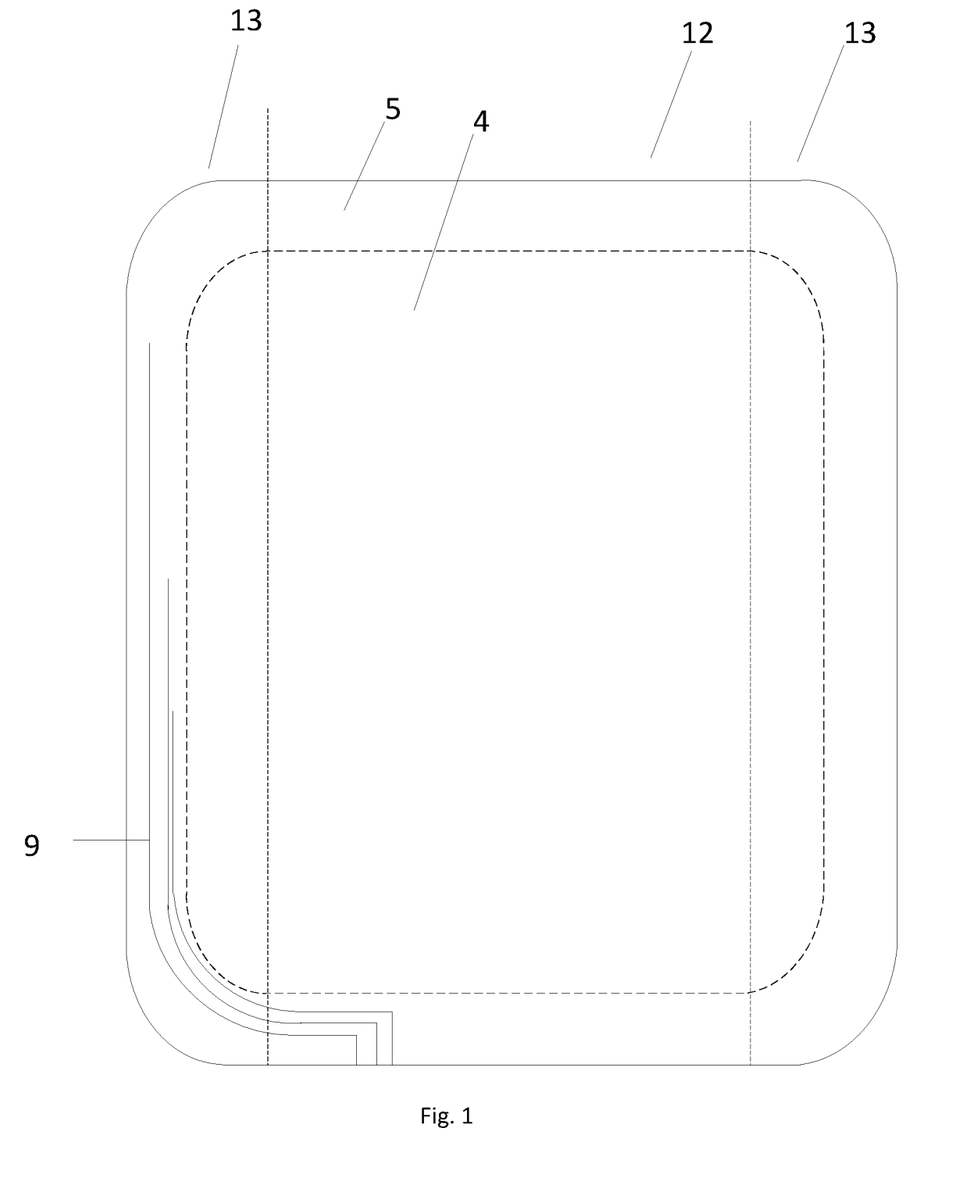
FIG. 1 is a schematic structural diagram of a touch substrate provided in the related art.

It needs to be noted that, in the related art, as shown in FIG. 1, touch leads 9 are located in a peripheral region 5 and disposed along an edge of a display region 4, at least part of the touch leads 9 include an arc part, and a boundary (shown by a dotted line in the figure) between a bending region 13 and a flat region 12 of a display product overlaps the arc part of the touch lead. That is, a bending boundary of a cover plate of the display product overlaps the arc part of the touch lead, the attachment of the cover plate may cause the touch lead at the bending boundary to suffer a bending stress, and the bending stress over the arc part is relatively large, which easily causes the arc part at the bending boundary to break, affecting the yield of the display product.

Figure 2:
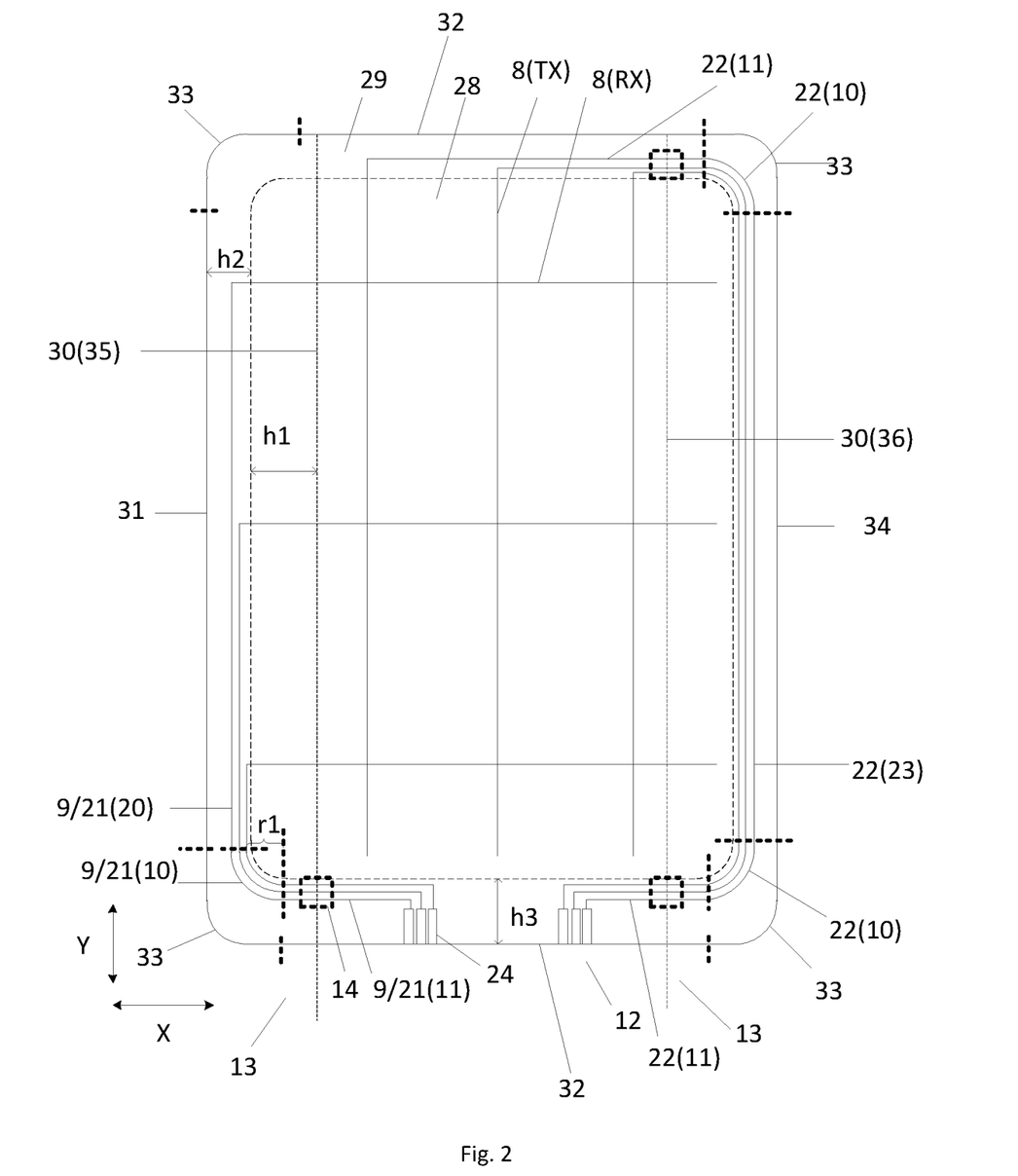
FIG. 2 is a schematic structural diagram of a touch substrate provided by an embodiment of the disclosure.

Based on the above problems existing in the related art, a touch substrate provided by an embodiment of the disclosure, as shown in FIG. 2, includes a plurality of touch electrodes 8 and a plurality of touch leads 9. The touch substrate includes a touch region 28 and a non-touch region 29, the plurality of touch electrodes 8 are located in the touch region 28, and the plurality of touch leads 9 are located in the non-touch region 29 and configured to provide signals for the plurality of touch electrodes 8. The touch substrate includes at least one bending boundary 30, and the touch substrate is divided into a flat region 12 and a bending region 13 located on at least one side of the flat region 12. For example, the bending regions 13 may be located on two opposite sides of the flat region 12.

The touch substrate includes: a first edge 31, a second edge 32 adjacent to the first edge 31, and a corner 33 between the first edge 31 and the second edge 32. The at least one bending boundary 30 is at least partially located in the touch region 28 and extends to the non-touch region 29, and the at least one bending boundary 30 substantially extends in an extension direction of the first edge 31 and intersects with the second edge 32.

At least one touch lead 9 among the plurality of touch leads 9 includes: a corner lead 10 located in at least one corner 33 in the touch substrate, and a first lead portion 11 connected with an end of the corner lead 10. The first lead portion 11 substantially extends in an extension direction of the second edge 32, and the corner lead 10 is completely located in the bending region 13 and does not overlap the bending boundary 30.

According to the touch substrate provided by the embodiment of the disclosure, the corner lead of the touch lead is completely located in the bending region, and the first lead portion of the touch lead extends from the bending region to the flat region. That is, the bending boundary overlaps the first lead portion but does not overlap the corner lead. Therefore, the bending stress over the touch lead may be reduced, thereby avoiding breaking of the touch lead in a region where the touch lead overlaps the bending boundary, and improving the yield of a touch product.

In some embodiments, a position where the corner of the touch substrate is located is a position where any two edges among four edges of the touch substrate are adjacent.

In some embodiments, as shown in FIG. 2, the touch substrate includes four corners 33. The touch substrate includes a third edge 34 disposed opposite to the first edge 31; and the third edge 34 is also connected with the second edge 32 through the corners 33. As shown in FIG. 2, the touch substrate includes: two bending boundaries 30, close to the first edge 31 and the third edge 34 respectively, and the touch substrate is divided into a flat region 12 and bending regions 13 located on two opposite sides of the flat region 12. As shown in FIG. 2, the two bending boundaries 30 are: a first bending boundary 35 close to the first edge 31, and a second bending boundary 36 close to the third edge 34 respectively.

In some embodiments, the first edge, the second edge and the third edge are all straight edges.

In some embodiments, the position where the corner is located may be in an arc shape or any other shape, for example, the corner may include an arc, and positions where parts of the straight edges are located.

In some embodiments, the corner lead of the touch lead is at least located at the position where at least one corner of the touch substrate is located.

In some embodiments, as shown in FIG. 2, the corner lead 10 is an arc lead, and the first lead portion 11 is a straight lead.

In some embodiments, the corner lead is not limited to the arc, and may be defined as any shape of wiring based on a contour and a shape of a transition region where the touch lead transitions from a straight edge region on one side to a straight edge region on the other side, and the extension direction of the touch lead at the beginning and end of the transition region changes. In the corner, the corner lead has an extension direction different from at least one of straight portions of the touch leads in two adjacent straight edge regions. The corner lead allows smooth transition and connection of the touch leads in two intersection directions.

In some embodiments, as shown in FIG. 2, the first lead portion 11 is at least partially located in the bending region 13 and overlaps the bending boundary 30.

In some embodiments, as shown in FIG. 2, the part of the first lead portion 11 close to the corner lead 10 is located in the bending region 13, and the part of the first lead portion 11 away from the corner lead 10 is located in the flat region 12.

In some embodiments, as shown in FIG. 2, the first lead portion 11 and the second edge 32 extend in a first direction X, and the first edge 31 and the bending boundary 30 extend in a second direction Y.

In some embodiments, as shown in FIG. 2, the first direction X is perpendicular to the second direction Y, that is, the extension direction of the first lead portion 11 is perpendicular to the extension direction of the bending boundary 30.

In some embodiments, as shown in FIG. 2, the touch electrode 8 includes: a plurality of touch sensing electrodes RX extending in the first direction X, and a plurality of touch driving electrodes TX extending in the second direction Y.

During specific implementation, the touch sensing electrodes RX and the touch driving electrodes TX all need to be electrically connected with the touch leads.

During specific implementation, the touch leads are used for providing drive signals for corresponding touch electrodes or receiving sensing signals on the corresponding touch electrodes. That is, the touch leads electrically connected with the touch sensing electrodes RX receive the sensing signals on the corresponding touch sensing electrodes RX, and the touch leads electrically connected with the touch driving electrodes TX are used for providing the drive signals for the corresponding touch driving electrodes TX.

It needs to be noted that FIG. 2 takes a situation that the touch sensing electrodes RX and the touch driving electrodes TX are in a strip shape as an example for illustration.

During specific implementation, the touch sensing electrodes RX and the touch driving electrodes TX may include rhombus block electrodes.

During specific implementation, the touch electrodes may be, for example, grid-shaped electrodes.

In some embodiments, as shown in FIG. 2, the other end of the corner lead 10 is connected with a second lead portion 20, and the second lead portion 20 substantially extends in the extension direction of the first edge 31, and is completely located in the bending region 13, and does not overlap the bending boundary 30.

In some embodiments, as shown in FIG. 2, the second lead portion is a straight lead extending in the second direction Y.

In some embodiments, as shown in FIG. 2, the touch substrate further includes: a plurality of wiring terminals 24 located in the non-touch region.

In some embodiments, a part of the touch leads only include one first lead portion, one corner lead and one second lead portion. One end of the second lead portion not connected with the corner lead is electrically connected with one of the plurality of touch electrodes, and the first lead portion is electrically connected with one of the plurality of wiring terminals.

In some embodiments, the touch sensing electrodes RX are electrically connected with the touch leads in the extension direction of the touch sensing electrodes RX. That is, as shown in FIG. 2, the plurality of touch sensing electrodes RX in their extension direction are electrically connected with a plurality of first touch leads 21 respectively. The first touch lead 21 includes one first lead portion 11.

In some embodiments, as shown in FIG. 2, the first touch lead 21 includes: a corner lead 10, a first lead portion 11 connected with an end of the corner lead 10, and a second lead portion 20 electrically connected with the other end of the corner lead 10 and the touch electrodes 8; here, the second lead portion 20 is completely located in the bending region 13.

In some embodiments, as shown in FIG. 2, the first lead portion 11 in the first touch lead 21 is electrically connected with one of the plurality of wiring terminals 24.

In some embodiments, at least one of the plurality of touch leads includes: two corner leads and two first lead portions. The second lead portion is connected with the two corner leads, one of the two first lead portions is electrically connected with one of the plurality of wiring terminals, and the other one of the two first lead portions is electrically connected with one of the plurality of touch electrodes.

In some embodiments, as shown in FIG. 2, the touch driving electrode TX is electrically connected with the second touch lead 22 on a side away from the wiring terminal 24. That is, as shown in FIG. 2, the second touch lead 22 needs to extend from a top of the touch substrate along an edge of the touch region 28 to a bottom of the touch substrate to be electrically connected with a side of the wiring terminal 24. In this way, the second touch lead 22 electrically connected with the touch driving electrodes TX needs to pass through two corners of the touch region 28. That is, each second touch lead 22 includes two corner leads 10 and two first lead portions 11, and further needs to include a second lead portion 20 connecting the two corner leads 10. One of the two first lead portions 11 is configured to be electrically connected with the wiring terminal 24, and the other one of the two first lead portions 11 is electrically connected with the touch electrode 8. The second lead portion 20 is completely located in the bending region 13, the two corner leads 10 both are completely located in the bending region 13, parts of the two first lead portions 11 close to the corner leads 10 both are located in the bending region 13, and parts of the two first lead portions 11 away from the corner leads 10 both are located in the flat region 12.

In some embodiments, as shown in FIG. 2, the first lead portions 11 in the plurality of first touch leads 21 overlap the first bending boundary 35, and the first lead portions 11 in the plurality of second touch leads 22 overlap the second bending boundary 36. The second lead portions 20 of the plurality of first touch leads 21 are located between the first bending boundary 35 and the first edge 31, and the corner leads 10 of the plurality of first touch leads 21 are located at a corner between the first edge 31 and the second edge 32. The second lead portions 20 of the plurality of second touch leads 22 are located between the second bending boundary 36 and the third edge 34, and the corner leads 10 of the plurality of second touch leads 22 are located at a corner between the third edge 34 and the second edge 32.

It needs to be noted that FIG. 2 takes a situation that a part of the touch leads extend from the top of the touch substrate along the edge of the touch region to the bottom of the touch substrate as an example for illustration. Of course, during specific implementation, a part of the touch leads may also be electrically connected with the touch electrodes extending in the second direction Y in the bottom of the touch substrate, and then this part of the touch leads does not include the corner leads, and may also not overlap the bending boundary.

In some embodiments, in at least part of the touch leads, the other end of the corner lead is electrically connected with one of the plurality of touch electrodes. That is, the corner lead in the part of the touch leads may be electrically connected with the touch electrode not through the second lead portion. During specific implementation, for example, the touch sensing electrode RX closest to the bottom of the touch substrate may be directly and electrically connected with the other end of the corner lead.

In some embodiments, a boundary of the touch region and the non-touch region has an arc part, and a radius of the arc part is smaller than a radius of the corner lead. An arc radius of the corner of the touch substrate is greater than the radius of the corner lead.

Figure 3:
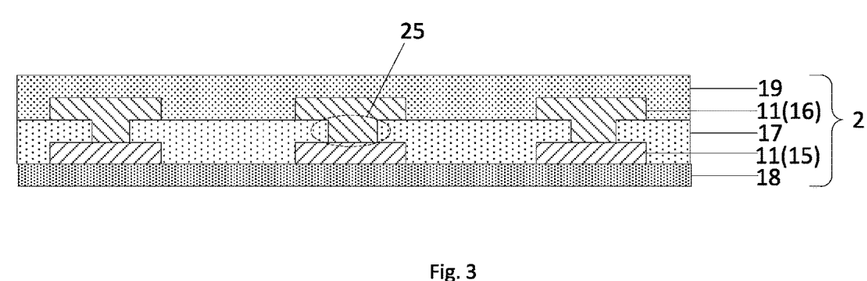
FIG. 3 is a sectional view of a touch substrate provided by an embodiment of the disclosure in an extension direction of a bending boundary.

In some embodiments, as shown in FIG. 3, the first lead portion 11 includes a first lead layer 15 and a second lead layer 16 which are disposed in a stacked manner.

In some embodiments, in addition to the first lead portion, other parts of the touch lead may also include a first lead layer and a second lead layer which are disposed in a stacked manner.

In some embodiments, the first lead layer of the first lead portion is connected with the first lead layer of other parts of the touch lead, and the second lead layer of the first lead portion is connected with the second lead layer of other parts of the touch lead.

In some embodiments, as shown in FIG. 3, in a region where the bending boundary overlaps the first lead portion, the second lead layer 16 is electrically connected with the first lead layer 15.

It needs to be noted that, the region where the bending boundary overlaps the first lead portion refers to a region where a region including two parts with the bending boundary as an axis of symmetry and each having a width of preset set distance in the first direction X overlaps the first lead portion(s). During specific implementation, as shown in FIG. 2, the bending boundary 30 overlaps the first lead portions 11 in a first sub-region 14 of the non-touch region 29. The region where the bending boundary overlaps the first lead portion is the first sub-region.

In some embodiments, as shown in FIG. 3, the touch substrate 2 further includes a first insulating layer 17 between the first lead layer 15 and the second lead layer 16, and the first insulating layer 17 has a first via hole 25 going through the first insulating layer in the thickness direction of the first insulating layer. The bending boundary overlaps the first via hole 25, and the second lead layer 16 is electrically connected with the first lead layer 15 through the first via hole 25.

According to the touch substrate provided by the embodiment of the disclosure, in the region where the bending boundary overlaps the first via hole, by disposing the first via hole in the first insulating layer, a release of the bending stress may be realized during a subsequent cover plate attaching process, the stress over by the touch lead may be further relieved, the breaking of the touch lead in the region where the touch lead overlaps the bending boundary can be further avoided, and the yield of a touch product can be improved.

Or, in some embodiments, as shown in FIG. 3, the touch substrate 2 further includes a first insulating layer 17 between the first lead layer 15 and the second lead layer 16, and the first insulating layer 17 has a first via hole 25 going through the first insulating layer along the thickness direction of the first insulating layer. The bending boundary does not overlap the first via hole 25, and the first via hole 25 is at least partially located in the region where the bending boundary overlaps the first lead portion; and the second lead layer 16 is electrically connected with the first lead layer 15 through the first via hole 25.

In some embodiments, the first lead layer or second lead layer includes a first sub-lead portion and a second sub-lead portion which are disconnected at the bending boundary.

That is, a lead layers is interrupted in the region where the bending boundary overlaps the first lead portion, in this way, a film layer thickness of a touch module in the region where the bending boundary overlaps the first via hole may be reduced, so as to reduce film layer stress generated on the touch lead during cover plate attachment and solve the problem of peeling or breaking of different film layers caused by stress gradient differences, and the yield of the touch product can be improved.

Figure 4:
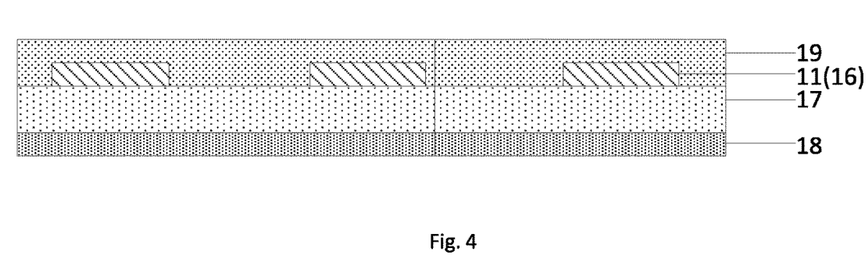
FIG. 4 is a sectional view of another touch substrate provided by an embodiment of the disclosure in an extension direction of a bending boundary.
Figure 5:
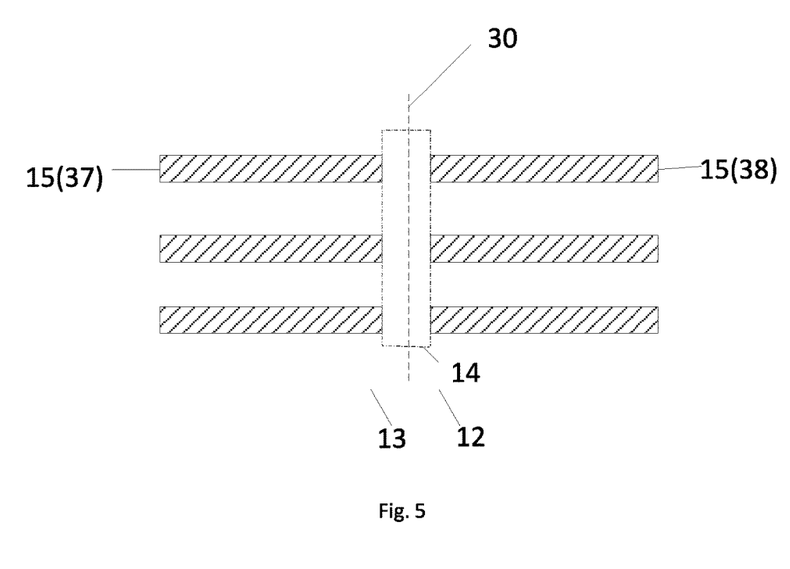
FIG. 5 is a structural diagram of a first lead layer of a touch substrate provided by an embodiment of the disclosure.

In some embodiments, as shown in FIG. 4 and FIG. 5, the second lead layer 16 is located on a side of the first lead layer facing a touch surface of the touch substrate, and the first lead layer 15 includes a first sub-lead portion 37 and a second sub-lead portion 38.

In some embodiments, as shown in FIG. 3 and FIG. 4, the touch substrate 2 further includes a base 18 located on s side of the first lead layer 15 facing away from the first insulating layer 17, and a protection layer 19 located on a side of the second lead layer 16 facing away from the first insulating layer 17.

In some embodiments, the first lead layer and the second lead layer include a metal material.

In some embodiments, the plurality of touch electrodes include a first touch electrode layer and a second touch electrode layer. The first touch electrode layer and the first lead layer are disposed in the same layer, and the second touch electrode layer and the second lead layer are disposed in the same layer.

During specific implementation, the touch sensing electrodes and the touch driving electrodes are located in the first touch electrode layer and the second touch electrode layer respectively. Alternatively, the touch sensing electrode or the touch driving electrode includes an electrode portion and a bridging portion, where the bridging portion is located in one of the first touch electrode layer and the second touch electrode layer, and the electrode portion is located in the other layer of the first touch electrode layer and the second touch electrode layer.

It needs to be noted that FIG. 3 and FIG. 4 are sectional views in the extension direction of the bending boundary in the non-touch region. For example, during specific implementation, FIG. 3 and FIG. 4 may be sectional views along the bending boundary in the non-touch region.

In some embodiments, when the first lead portion 11 in the first sub-region includes the first lead layer and the second lead layer, and the first lead layer is electrically connected with the second lead layer through the first via hole, an orthographic projection of the first via hole on a plane where the flat region of the touch substrate is located is located within the first sub-region.

In some embodiments, when the first lead layer or the second lead layer in the first sub-region includes the first sub-lead portion and the second sub-lead portion which are disconnected, the first sub-lead portion and the second sub-lead portion are located on two sides of the first sub-region respectively.

In some embodiments, as shown in FIG. 5, the first sub-lead portion 37 and the second sub-lead portion 38 are disconnected in the first sub-region 14. An edge of the first sub-lead portion 37 close to the bending boundary 30 coincides with an edge of the first sub-region 14, and an edge of the second sub-lead portion 38 close to the bending boundary 30 coincides with an edge of the first sub-region 14.

In some embodiments, as shown in FIG. 2, the bending boundary 30 divides the first sub-region 14 equally. That is, a distance between the edge of the first sub-lead portion 37 close to the bending boundary 30 and the bending boundary 30 is equal to a distance between the edge of the second sub-lead portion 38 close to the bending boundary 30 and the bending boundary 30.

In some embodiments, a distance between an edge of the first sub-region extending in a second direction and the bending boundary is 200 micrometers.

In some embodiments, a bending angle of the bending region is greater than or equal to 80 degrees. During specific implementation, the bending angle of the bending region is, for example, 88 degrees.

Figure 6:
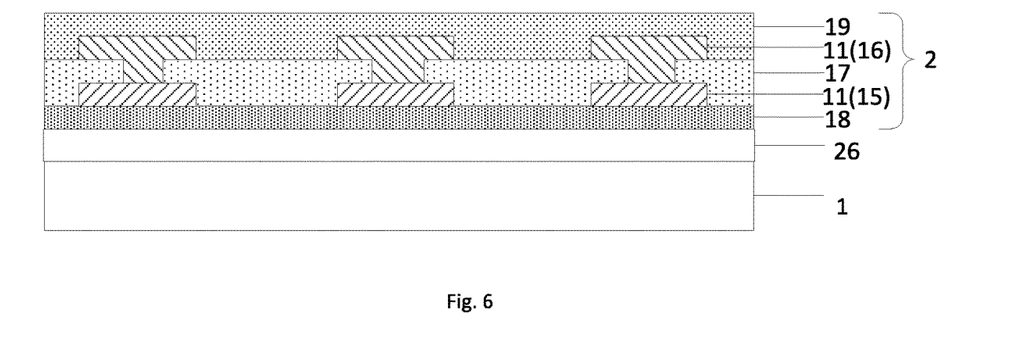
FIG. 6 is a schematic structural diagram of a display touch panel provided by an embodiment of the disclosure.
Figure 7:
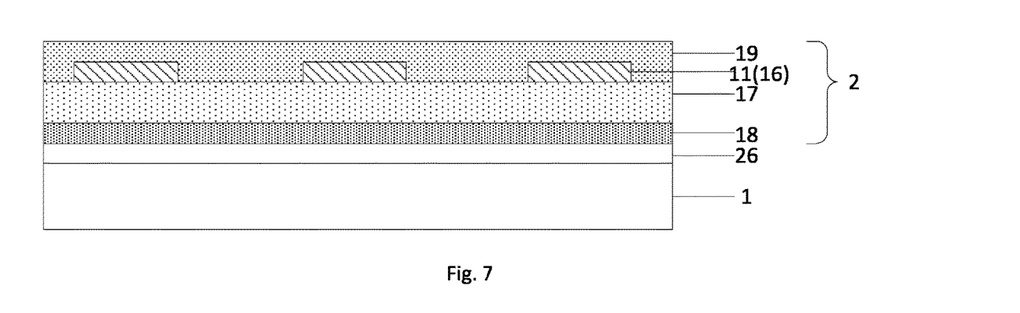
FIG. 7 is a schematic structural diagram of another display touch panel provided by an embodiment of the disclosure.

Based on the same inventive concept, an embodiment of the disclosure further provides a display touch panel, as shown in FIG. 6 and FIG. 7, including:
  a drive backplane 1, including a display region and a peripheral region surrounding the display region;
  a plurality of light emitting devices (not shown), located on a side of the drive backplane 1 in the display region;
  a packaging layer 26, located on a side of the light emitting devices facing away from the drive backplane; and
  the above touch substrate 2 provided by the embodiment of the disclosure, directly formed on the packaging layer 26.

It needs to be noted that, the display region coincides with a touch region of the touch substrate, and the peripheral region coincides with a non-touch region. The display touch panel has the same bending region and flat region as the touch substrate.

According to the display touch panel provided by the embodiment of the disclosure, since it includes the above touch substrate provided by the embodiment of the disclosure, a corner lead of a touch lead is completely located in a bending region, and a first lead portion of the touch lead extends from the bending region to the flat region, that is, a bending boundary overlaps the first lead portion and does not overlap the corner lead. Therefore, the bending stress over the touch lead can be reduced, breaking of the touch lead in the region where the touch lead overlaps the bending boundary can be avoided, and the yield of a display product can be improved.

During specific implementation, the embodiment of the disclosure adopts flexible multi layer on cell (FMLOC), and the touch substrate is directly formed on the packaging layer, to realize the lightness and thinness of products.

In some embodiments, a base 18 in the touch substrate 2 may be, for example, a buffer layer formed on the packaging layer 39.

In some embodiments, the drive backplane includes: a base substrate, and a pixel driving circuit layer disposed on the base substrate. In some embodiments, the base substrate may be, for example, a flexible base substrate. In some embodiments, the pixel driving circuit layer includes a pixel driving circuit array. The pixel driving circuit includes, for example, transistor(s) and capacitor(s). The light emitting devices are electrically connected with the pixel driving circuit.

During specific implementation, the packaging layer is, for example, formed by an inorganic layer and an organic layer which are disposed in a stacked manner.

In some embodiments, the display region coincides with the touch region, and the peripheral region coincides with the non-touch region; and the display region includes a plurality of pixels. That is, the bending boundary goes through the display region.

In some embodiments, the quantity N of pixel columns between an edge of the display region in the flat region and a closest bending boundary, a bending radius r1 of a corner lead closest to the display region, a pixel spacing $P_{pixel}$, and a total thickness Total of the touch substrate meet the following condition:

$$N = \frac{\pi \times (r1 - \text{Total}) \times 1000}{P_{pixel}}.$$

In some embodiments, the radius r1 of the corner lead closest to the touch region is greater than or equal to 1.5 millimeters and smaller than or equal to 2.4 millimeters.

It needs to be noted that, in the related art, the radius of the corner lead of the touch lead is usually greater than 7 millimeters. This not only leads to overlapping of the bending boundary and the corner lead, but also results in a large space occupation of the touch lead in the non-touch region, thereby greatly increasing the size of display regions of corners of the display product, which is not conducive to achieving narrow bezel display, reduces an effective light-emitting area of the display regions and the integrity of touch electrodes near the corners, affects the performance of the display product, and further increases a production cost of the display product.

According to the display touch panel provided by the embodiment of the disclosure, the radius of the corner lead of the touch lead is reduced, in this way, the bending boundary overlaps a straight lead of the touch lead but does not overlap the corner lead, without changing a bending position of the display product. Therefore, the bending stress over the touch lead can be reduced, the breaking of the touch lead at the bending boundary can be avoided, and the yield of the display product can be improved. Moreover, the space occupied by the touch lead in the non-touch region may further be reduced with the reduction of the radius of the corner lead of the touch lead, the size of the non-touch region, namely the peripheral region, can be reduced, which easily achieves narrow bezel display, and thus the effective light-emitting area of the display region can be improved. Moreover, the radius of the corner lead of the touch lead is reduced, a corresponding corner size of the display region is also reduced, so that the integrity of the touch electrodes near the corners of the display region can be ensured, the performance of the display product can be improved, and the production cost of the display product is reduced.

During specific implementation, for example, there are 48 pixel column between the bending boundary and a boundary of the display region extending in the second direction, and the pixel spacing is 2 millimeters. That is, as shown in FIG. 2, a distance h1 between the bending boundary 30 and the boundary of the display region (the touch region 28) extending in the second direction Y is about 96 millimeters.

In some embodiments, as shown in FIG. 2, a distance h2 between an edge of the touch region 28 extending in the second direction Y and a first edge 31 is 1 millimeter. A distance h3 between the edge of the touch region 28 extending in the first direction X and a second edge at the bottom is 1.3 millimeters.

In some embodiments, a radius of a corner arc of the touch substrate is greater than or equal to 1 millimeter and smaller than or equal to 3.5 millimeters.

Figure 8:
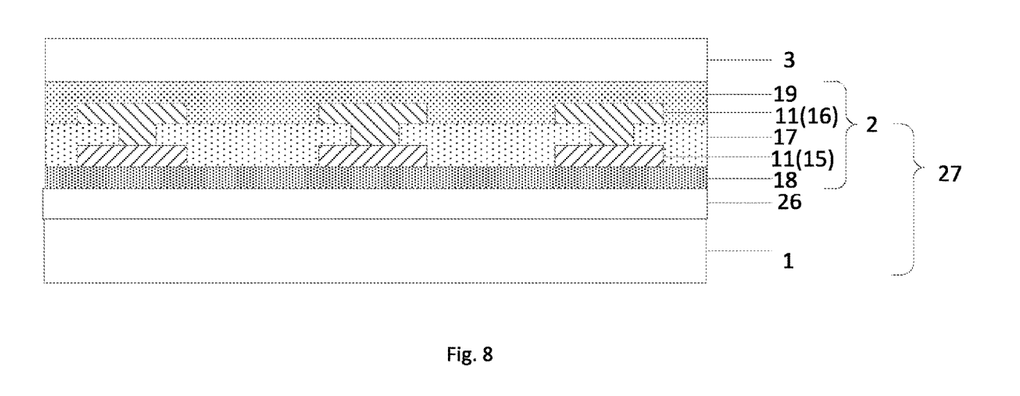
FIG. 8 is a schematic structural diagram of a display apparatus provided by an embodiment of the disclosure.
Figure 9:
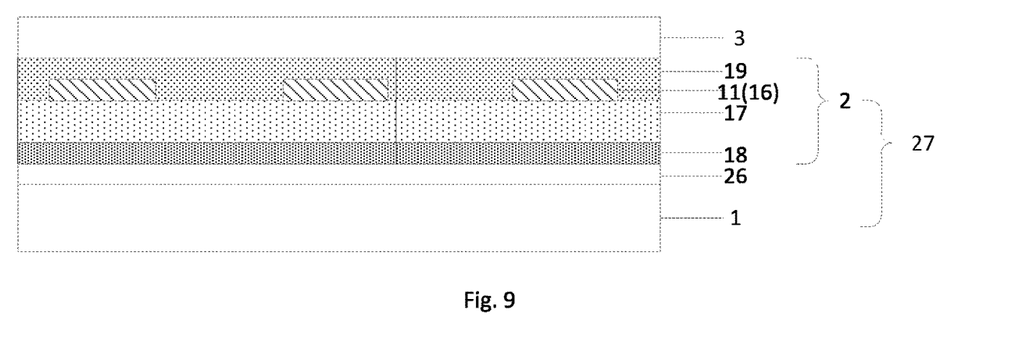
FIG. 9 is a schematic structural diagram of another display apparatus provided by an embodiment of the disclosure.

Based on the same inventive concept, an embodiment of the disclosure further provides a display apparatus, as shown in FIG. 8 and FIG. 9, including the display touch panel 27 provided by the embodiment of the disclosure.

In some embodiments, as shown in FIG. 8 and FIG. 9, the display apparatus further includes:
 a cover plate 3, attached to the display touch panel 27 on a side of a touch substrate 2 facing away from a drive backplane 1, where the cover plate 3 has the same bending region and flat region as the touch substrate 2.

The display apparatus provided by the embodiment of the disclosure includes the above display touch panel provided by the embodiment of the disclosure, a corner lead of a touch lead is completely located in a bending region, and a first lead portion of the touch lead extends from the bending region to the flat region, that is, a bending boundary overlaps the first lead portion and does not overlap the corner lead. Therefore, the bending stress over the touch lead in a bending process of the cover plate can be reduced, breaking of the touch lead in a region where the touch lead overlaps the bending boundary can be avoided, and the yield of a display product can be improved.

In some embodiments, a bending angle of the bending region of the cover plate is greater than or equal to 80 degrees. During specific implementation, the bending angle of the bending region is, for example, 88 degrees.

In some embodiments, when a first lead portion includes a first lead layer and a second lead layer which are disposed in a stacked manner, and the first lead layer or the second lead layer includes a first sub-lead portion and a second sub-lead portion which are disconnected at a bending boundary, the quantity n of pixel columns between the first sub-lead portion and the bending boundary, as well as the second sub-lead portion and the bending boundary meets the following condition:

$$n = (A + W)/P_{pixel};$$

where, A is attaching accuracy between the cover plate and the display touch panel, and W is a maximum transmission range of bending stress over the display touch panel.

During specific implementation, the display apparatus may further include, for example, a frame, the display touch panel may be embedded into the frame, and an edge of a peripheral region corresponds to a frame boundary.

The display apparatus provided the embodiment of the disclosure is a mobile phone, a tablet computer, a television, a display, a laptop, a digital photo frame, a navigator and any product or component with a display function. Other essential components of the display apparatus shall be understood by those ordinarily skilled in the art, and are omitted here and also shall not be used as a restriction to the disclosure. The implementation of the display apparatus may refer to the embodiments of the above touch substrate and the display touch panel, and repetitions will not be made.

To sum up, according to the touch substrate, the display touch panel and the display apparatus provided by the embodiments of the disclosure, the corner lead of the touch lead is completely located in the bending region, and the first lead portion of the touch lead extends from the bending region to the flat region, that is, the bending boundary overlaps the first lead portion and does not overlap the corner lead. Therefore, the bending stress over the touch lead may be reduced, thereby avoiding breaking of the touch lead in the region where the touch lead overlaps the bending boundary, and improving the yield of the touch product.

Although the preferred embodiments of the disclosure have been described, those skilled in the art can make additional changes and modifications on these embodiments once they know the basic creative concept. So the appended claims are intended to include the preferred embodiments and all changes and modifications that fall into the scope of the disclosure.

Apparently, those skilled in the art may perform various changes and modifications on the embodiments of the disclosure without departing from the spirit and scope of the embodiments of the disclosure. Therefore, if these changes and modifications on the embodiments of the disclosure fall in the scope of the claims of the disclosure and their equivalent technologies, the disclosure is also intended to include these changes and modifications.

What is claimed is:

1. A touch substrate, comprising a plurality of touch electrodes and a plurality of touch leads;
    wherein the touch substrate comprises a touch region and a non-touch region, the plurality of touch electrodes are located in the touch region, and the plurality of touch leads are located in the non-touch region and configured to provide signals for the plurality of touch electrodes;
    the touch substrate comprises at least one bending boundary, and the touch substrate is divided into a flat region and a bending region located on at least one side of the flat region;
    the touch substrate comprises a first edge, a second edge adjacent to the first edge, and a corner between the first edge and the second edge;
    the at least one bending boundary is at least partially located in the touch region and extends to the non-touch region, and the at least one bending boundary substantially extends in an extension direction of the first edge and intersects with the second edge; and
    at least one touch lead among the plurality of touch leads comprises: a corner lead located in at least one corner in the touch substrate, and a first lead portion connected with an end of the corner lead; wherein the first lead portion substantially extends in an extension direction of the second edge, and the corner lead is completely located in the bending region and does not overlap the bending boundary;
    wherein the first lead portion comprises a first lead layer and a second lead layer which are disposed in a stacked manner, and in a region where the bending boundary overlaps the first lead portion, the second lead layer is electrically connected with the first lead layer.

2. The touch substrate according to claim 1, wherein the first lead portion is at least partially located in the bending region and overlaps the bending boundary.

3. The touch substrate according to claim 1, wherein the other end of the corner lead is connected with a second lead portion; wherein the second lead portion substantially extends in the extension direction of the first edge, and is completely located in the bending region and does not overlap the bending boundary.

4. The touch substrate according to claim 3, wherein the touch substrate further comprises a plurality of wiring terminals located in the non-touch region;
    at least one of the plurality of touch leads comprises: two corner leads and two first lead portions;
    wherein the second lead portion is connected with the two corner leads; and
    one of the two first lead portions is electrically connected with one of the plurality of wiring terminals, and the other one of the two first lead portions is electrically connected with one of the plurality of touch electrodes.

5. The touch substrate according to claim 1, wherein the other end of the corner lead is electrically connected with one of the plurality of touch electrodes.

6. The touch substrate according to claim 1, wherein the touch substrate further comprises a third edge disposed opposite to the first edge; and
    the touch substrate comprises: two bending boundaries close to the first edge and the third edge respectively; wherein the touch substrate is divided into a flat region and bending regions located on two opposite sides of the flat region.

7. The touch substrate according to claim 6, wherein the corner lead in at least one touch lead among the plurality of touch leads is located at a corner between the third edge and the second edge;
    and/or
        the corner lead is an arc lead, the first lead portion is a straight lead, and the second lead portion is a straight lead.

8. The touch substrate according to claim 7, wherein a boundary of the touch region and the non-touch region has an arc part, and a radius of the arc part is smaller than a radius of the corner lead.

9. The touch substrate according to claim 1, wherein the touch substrate further comprises a first insulating layer between the first lead layer and the second lead layer;
    wherein the first insulating layer has a first via hole going through the first insulating layer along a thickness direction of the first insulating layer; and
    the bending boundary overlaps the first via hole, and the second lead layer is electrically connected with the first lead layer through the first via hole.

10. The touch substrate according to claim 1, wherein a bending angle of the bending region is greater than or equal to 80 degrees.

11. A display touch panel, comprising:
a drive backplane, comprising a display region and a peripheral region surrounding the display region;
a plurality of light emitting devices, located on a side of the drive backplane in the display region;
a packaging layer, located on a side of the light emitting devices facing away from the drive backplane; and
the touch substrate according to claim 1, directly formed on the packaging layer.

12. The display touch panel according to claim 11, wherein the display region coincides with a touch region, and the display region comprises a plurality of pixels arranged in an array; and
a quantity N of pixel columns between an edge of the display region located in a flat region and a bending boundary closest to the display region, a bending radius r1 of a corner lead closest to the display region, a pixel spacing $P_{pixel}$, and a total thickness Total of the touch substrate meet a following condition:

$$N = \frac{\pi \times (r1 - \text{Total}) \times 1000}{P_{pixel}}.$$

13. The display touch panel according to claim 12, wherein the radius r1 of the corner lead closest to the touch region is greater than or equal to 1.5 millimeters and smaller than or equal to 2.4 millimeters.

14. A display apparatus, comprising the display touch panel according to claim 11.

15. The display apparatus according to claim 14, further comprising:
a cover plate, attached to the display touch panel on a side of a touch substrate facing away from a drive backplane, wherein the cover plate has a bending region and a flat region same as the touch substrate.

16. The display apparatus according to claim 15, wherein when a first lead portion comprises a first lead layer and a second lead layer which are disposed in a stacked manner, and the first lead layer or the second lead layer comprises a first sub-lead portion and a second sub-lead portion which are disconnected at a bending boundary, a quantity n of pixel columns between the first sub-lead portion and the bending boundary, as well as the second sub-lead portion and the bending boundary meets the following condition:

$$n = (A + W)/P_{pixel};$$

wherein, A is attaching accuracy between the cover plate and the display touch panel, and W is a maximum transmission range of bending stress over the display touch panel.

17. The touch substrate according to claim 1, wherein the touch substrate further comprises a first insulating layer between the first lead layer and the second lead layer;
wherein the first insulating layer has a first via hole going through the first insulating layer along a thickness direction of the first insulating layer;
the bending boundary does not overlap the first via hole; and
the first via hole is at least partially located in the region where the bending boundary overlaps the first lead portion, and the second lead layer is electrically connected with the first lead layer through the first via hole.

18. A touch substrate, comprising a plurality of touch electrodes and a plurality of touch leads;
wherein the touch substrate comprises a touch region and a non-touch region, the plurality of touch electrodes are located in the touch region, and the plurality of touch leads are located in the non-touch region and configured to provide signals for the plurality of touch electrodes;
the touch substrate comprises at least one bending boundary, and the touch substrate is divided into a flat region and a bending region located on at least one side of the flat region;
the touch substrate comprises a first edge, a second edge adjacent to the first edge, and a corner between the first edge and the second edge;
the at least one bending boundary is at least partially located in the touch region and extends to the non-touch region, and the at least one bending boundary substantially extends in an extension direction of the first edge and intersects with the second edge; and
at least one touch lead among the plurality of touch leads comprises: a corner lead located in at least one corner in the touch substrate, and a first lead portion connected with an end of the corner lead; wherein the first lead portion substantially extends in an extension direction of the second edge, and the corner lead is completely located in the bending region and does not overlap the bending boundary;
wherein the first lead portion comprises a first lead layer and a second lead layer which are disposed in a stacked manner, and the first lead layer or the second lead layer comprises a first sub-lead portion and a second sub-lead portion which are disconnected at the bending boundary.

19. The touch substrate according to claim 18, wherein a distance between an edge of the first sub-lead portion close to the bending boundary and the bending boundary is equal to a distance between an edge of the second sub-lead portion close to the bending boundary and the bending boundary.

20. The touch substrate according to claim 18, wherein the second lead layer is located on a side of the first lead layer facing a touch surface of the touch substrate, and the first lead layer comprises the first sub-lead portion and the second sub-lead portion.

* * * * *